3,847,990
PROCESS FOR THE PRODUCTION OF NITRODIPHENYL AMINE DERIVATIVES

Johannes Blahak, Cologne, Germany, assignor to Bayer Aktiengesellschaft, Leverkusen, Germany
No Drawing. Filed Sept. 26, 1972, Ser. No. 292,445
Claims priority, application Germany, Sept. 28, 1971, P 21 48 223.5
Int. Cl. G07c 87/60
U.S. Cl. 260—576        13 Claims

ABSTRACT OF THE DISCLOSURE

Object of the invention is a process for the production of nitrodiphenyl amine compounds by decarboxylating the corresponding urethanes in the presence of a catalyst at temperatures of from 100 to 250° C. either in the presence or in the absence of a solvent. Nitrodiphenyl amine compounds are important intermediates for the synthesis of anti-agers of the p-alkylaminodiphenyl amine type.

---

German Auslegeschrift No. 1,030,834 describes a process for the production of 4-nitrodiphenyl amine by reacting paranitrochlorobenzene with aniline in the presence of a molar quantity of potassium carbonate as a binding agent for the hydrochloric acid liberated and a copper salt as a catalyst. In order to obtain commercially desirable yields, the water formed during neutralisation also has to be removed. German Auslegeschrift No. 1,056,619 discloses the use of acylated anilines as starting components. A molar quantity of an acid-binding agent is also added in this process, always resulting in the accumulation of relatively large quantities of salt which have to be removed during working up.

The present invention relates to a chemically unique process for the production of a nitrodiphenyl amine derivative corresponding to the general formula:

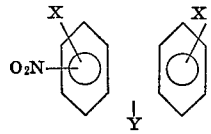

in which the symbols X can be the same or different from each other and represents hydrogen, alkyl, isoalkyl or cycloalkyl having up to 6 carbon atoms, halogen or nitro groups, whilst Y represents hydrogen, alkyl, isoalkyl or cycloalkyl having up to 6 carbon atoms, wherein a urethane corresponding to the general formula:

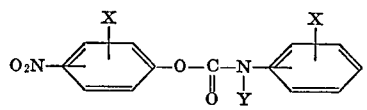

in which X and Y are as just defined, is decarboxylated in the presence of a catalytic quantity of a strong base at a temperature in the range of from 100° C. to 250° C., but preferably at a temperature in the range of from 150° C. to 220° C., either in the presence or in the absence of a solvent. The fact that nitrodiphenylamine derivatives can be prepared from nitrophenyl urethanes or directly from the non-isolated reaction products of nitrophenols and phenyl isocyanates is surprising because urethanes obtained in this way readily decompose into phenols and isocyanates, as described by S. Petersen A. 562,207 (1949). According to J. M. Lyons, R. H. Thomson, Soc. 1950, 1971, acid phenols in particular, such as 2,4-dinitrophenol for example, "cannot under any circumstances be reacted with phenyl isocyanate."

The urethanes which can be used for the decarboxylating reaction according to the invention can be obtained both by reacting corresponding phenols with isocyanates, as described by McKinley in Ind. Eng. Chem. Anal. 16, 304 (1944), and by reacting chlorocarbonic acid esters and amines (S. Petersen, A. 562, 207 et seq. (1949)). In addition, decarboxylation can preferably be carried out wtihout previous isolation of the urethanes by directly combining the nitrophenol and phenyl isocyanate components and subsequently heating them to a temperature in the range of from 100 to 250° C. in the presence of a catalytic quantity of a strong base. Solvents which boil at temperatures of from 150° to 220° C. and which do not react with the isocyanates can be used as the solvents but are not essential. Where the nitrophenols and isocyanates are directly combined, a quantitative ratio of isocyanate to nitrophenol of 0.5:1 to 5:1, but preferably from 1:1 to 2:1, is applied.

The urethanes used in accordance with the invention can be obtained, for example, by reacting paranitrophenol, orthonitrophenol, 2,4-dinitrophenol, 4-nitro-2-chlorophenol, 4-nitro-3-chlorophenol, 3-chloro-2-nitrophenol, 4-chloro-2-nitrophenol, 5-chloro-2-nitrophenol, 6-chloro-2-nitrophenol, 2,6-dichloro-4-nitrophenol, 4-nitro orthocresol, 4-nitrometa cresol, 6-nitro ortho cresol, 6-nitrometa cresol, 4-nitro-2-isopropyl phenol, 4-nitro-2-isobutyl phenol, 4-nitro-2-cyclohexyl phenol, with the following isocyanates: phenyl isocyanate, metamethylphenyl isocyanate, paramethylphenyl isocyanate, metaisobutylphenyl isocyanate, meta-2-ethyl hexylphenyl isocyanate, metacyclohexyl phenyl isocyanate, metachlorophenyl isocyanate, parachlorophenyl isocyanate, metanitrophenyl isocyanate and paranitrophenyl isocyanate.

Where the urethanes according to the invention are synthesised from chlorocarbonic acid esters and aniline derivatives, the following compounds for example are reacted: paranitrophenyl chlorocarbonic acid ester, orthonitrophenyl chlorocarbonic acid ester, 2,4-dinitrophenyl chlorocarbonic acid ester, 4-nitro-2-chlorophenyl chlorocarbonic acid ester, 4-nitro-3-chlorophenyl chlorocarbonic acid ester, 3-chloro-2-nitrophenyl chlorocarbonic acid ester, 4-chloro-2-nitrophenyl chlorocarbonic acid ester, 5-chloro-2-nitrophenyl chlorocarbonic acid ester, 6-chloro-2-nitrophenyl chlorocarbonic acid ester, 2,6-dichloro-4-nitrophenyl chlorocarbonic acid ester, 4-nitro-2-methylphenyl chlorocarbonic acid ester, 4-nitro-3-methylphenyl chlorocarbonic acid ester, 6-nitro-2-methylphenyl chlorocarbonic acid ester, 6-nitro-3-methylphenyl chlorocarbonic acid ester, 4-nitro-2-isopropylphenyl chlorocarbonic acid ester, 4-nitro-2-diisobutylphenyl chlorocarbonic acid ester and 4-nitro-2-cyclohexylphenyl chlorocarbonic acid ester.

The following compounds are mentioned as examples of aniline derivatives:

aniline, N-methylaniline, N-isopropyl aniline, N-cyclohexyl aniline, 4-methyl aniline, N-ethyl-4-methyl aniline, N-isobutyl-3-cyclohexyl aniline, 3-chloroaniline, 4-chloroaniline, N-methyl-2-chloroaniline, N-ethyl-2-chloroaniline, metanitraniline, paranitraniline, N-methylmetanitro aniline and N-isopropyl metanitro aniline.

Solvents which do not contain a Zerewitinoff-active hydrogen atom can be used as the solvents according to the invention with boiling points in the range from 100 to 250° C., preferably from 150 to 220° C. In the classes of substances listed in the following, polar members are particularly favourable.

1. Hydrocarbons and chlorinated hydrocarbons: n-nonane, n-butyl cyclohexane, decahydronaphthalene, n-undecane, n-dodecane, n-hexyl cyclohexane, dipentene, 1-dodecene, isopropyl benzene, 1,3-diethyl benzene, indene, n-butyl benzene, tetralin, chlorobenzene, 4-chlorotoluene, 1,2-dichlorobenzene, 2,4-dichlorotoluene, 1,2,4- trichlorobenzene, 2-chloro-4-isopropyl-1-methyl benzene.
2. Ethers such as anisol, cyclohexyl ethyl ether, diethylene glycol dimethyl ether, benzyl methyl ether, 4-methoxy toluene, parachloroanisol, di-n-hexyl ether.
3. Ketones such as 2-heptanone, cyclohexanone, 2-propyl-cyclohexanone, phenyl-n-propyl ketone, 2-undecanone.
4. Substituted acid amides such as N,N-dimethyl formamide, N,N-diethyl formamide.
5. Esters such as ethylene glycol monomethyl ether acetate, di-n-propyl carbonate, cyclohexyl acetate, diisobutyl carbonate, diethylene glycol monomethyl ether acetate, diisoamyl carbonate.
6. Substituted amines such as 2-ethyl pyridine, N,N-dimethyl-2-methyl aniline, N,N-dimethyl aniline, N-methyl-N-ethyl aniline, N,N-dimethyl-2-chloro aniline, N,N-diethyl aniline, quinoline.
7. Nitro compounds such as 1-nitrobutane, nitrocyclohexane, 1-nitroheptane, nitrobenzene, 2-nitrotoluene, 2,4-dimethyl-1-nitrobenzene.
8. Nitriles such as N-capronitrile, benzonitrile, tolunitrile and phenyl acetonitrile.

Suitable catalysts include alkali salts of organic acids for example lithium acetate, sodium acetate, potassium acetate, rubidium and caesium acetate, sodium formate, potassium benzoate and potassium phthalate. Also alkali metal carbonates, preferably sodium or potassium carbonate and oxides and hydroxides of alkali metals, preferably sodium or potassium hydroxide. Nitrophenolates and basic compounds which are able to convert the nitrophenols into nitrophenolates are also suitable. Another class of catalytically active substances include Lewis bases such as tertiary high-boiling amines and phosphines for example N-methyl-di-β-hydroxy diphenyl ether and tri-n-butyl phosphine.

The catalyst is used in a quantity of from 0.5 to 50 mol percent but preferably in a quantity of from 1 to 10 mol percent, based on the mols of nitrophenol or nitrophenyl-N-phenyl urethane used.

Nitrodiphenyl amine and its derivatives are important intermediate products for the synthesis of compounds of the p-alkyl amino diphenyl amine type which largely prevent the oxidation of natural and/or synthetic rubbers by oxygen. They are of considerable commercial significance.

EXAMPLE 1

139.1 g. (1 mol) of dry nitrophenol and 10 g. of potassium acetate are heated to 200° C. in a 500 cc. mixer flask connected to a gas meter. 131 g. (1.1 mol) of phenyl isocyanate are added through a dropping funnel at the aforementioned temperature, after which a temperature of 190 to 200° C. is maintained for 6 hours at which time the gas meter indicates that 24 litres of carbon dioxide (1 mol at 25° C.) have evolved. Preparative thick-layer chromatography on silica gel with benzene as the eluent gives 4-nitrodiphenyl amine melting at 128 to 130° C. in a yield of 78% of the theoretical. When recrystallised from carbon tetrachloride, the product has a melting point of 132 to 133° C. (The IR-spectra are identical with the standard substance.)

251 g. of crude product are taken up in 1500 ml. of toluene at 50 to 60° C. and stirred together with 1000 ml. of 5% sodium hydroxide at 60° C. The aqueous phase is separated off and discarded whilst, after shaking with 500 ml. of water at 60° C. and clarification with 15 g. of Tonsil as filtration aid, the organic solvent was distilled off in vacuo. 162.5 g. of 4-nitrodiphenyl amine melting at 120 to 126° C. are left. With concentrated sulphuric acid, the reddish-violet colour typical of 4-nitrodiphenyl amine is formed on heating. Yield: 76% of the theoretical.

EXAMPLE 2

139.1 g. (1 mol) of 4-nitrophenol and 2.8 g. of potassium hydroxide are stirred together at 150° C. and the water is removed by the brief application of a water-jet vacuum. Thereafter 500 ml. of nitrobenzene are added and the resulting mixture is heated to reflux. 179 g. (1.5 mol) of phenyl isocyanate are then added, and refluxing is continued for 8 hours. 23.7 litres of carbon dioxide escape. The yield of 4-nitrodiphenyl amine melting at 130–131° C. isolated after removal of the nitrobenzene by distillation and working up as in Example 1, amounts to 80.6% of the theoretical yield.

EXAMPLE 3

The procedure is as described in Example 1 except that a molar ratio of phenyl isocyanate to paranitrophenol of 2:1 is used. In this case, the yield of 4-nitrodiphenyl amine amounts to 83.5% of the theoretical yield.

EXAMPLE 4

The procedure is as described in Example 2 except that 5.3 g. of sodium carbonate are used as catalyst. The yield of 4-nitrodiphenyl amine amounts to 72% of the theoretical yield.

EXAMPLE 5

The procedure is as described in Example 1 except that 4.1 g. of potassium carbonate are used as catalyst. The yield of 4-nitrodiphenyl amine amounts to 75.5% of the theoretical yield.

EXAMPLE 6

92 g. of 2,4-dinitrophenol (0.5 mol), 5 g. of potassium acetate and 250 ml. of nitrobenzene are brought to the boil and 59.5 g. (0.5 mol) of phenyl isocyanate are added dropwise at 210° C. After 6 hours, the gas meter indicates that 12.8 litres of carbon dioxide have evolved. A sample is analysed by preparative thin-layer chromatography (benzene-silica gel system). The yield of 2,4-dinitrodiphenyl amine melting at 154 to 155° C. amounts to 67.5% of the theoretical yield (Lit.: Beilstein 12, 751: Melting point 156° C.).

EXAMPLE 7

139 g. of paranitrophenol (1 mol), 10 g. of potassium acetate and 500 ml. of nitrobenzene are heated to 210° C., and 230 g. (1.5 mol) of metachlorophenyl isocyanate are added at this temperature. Thereafter, the aforementioned temperature is maintained for a period of 8.5 hours. By this time, the gas meter connected to the reaction vessel indicates that 21.3 litres of carbon dioxide have evolved. Determination of the yield of preparative thick-layer chromatography gives 62.7% of the theoretical yield of 4-nitro-3'-chlorodiphenyl amine melting at 127–128° C. Lit.: Beilstein: 12, 715. Melting point 128° C.

EXAMPLE 8

The procedure is as described in Example 7, except that 1.5 mols of parachlorophenyl isocyanate are used. The reaction takes place more slowly. 17.7 litres of carbon dioxide have been evolved after 8.5 hours. The yield of 4-nitro-4'-chlorodiphenyl amine amounts to 61.7% of the theoretical yield of orange-coloured needles melting at 180 to 181° C. Analysis:

Calculated: C 58.0, H 3.62, N 11.3
Found: C 57.7, H 4.0, N 11.0

IR- and NR-spectra confirm the constitution.

EXAMPLE 9

The procedure is as described in Example 7 except that 1.5 mols of metamethylphenyl isocyanate are used. The quantity of carbon dioxide evolved after 8 hours amounts to 25.7 litres at 27° C. The yield of 4-nitro-3'-methyldiphenyl amine in the form of orange-coloured needles melting at 129° C. amounts to 78.5% of the theoretical yield. Analysis:

Calculated: C 68.4, H 5.27, N 12.28, O 14.1
Found: C 68.6, H 5.5, N 12.0, O 14.1

The infra-red and nuclear-resonance spectra are consistent with the constitution of 4-nitro-3'-methyldiphenyl amine.

EXAMPLE 10

258 g. (1 mol) of N-phenyl-4-nitrophenyl urethane are refluxed for 8 hours in 500 ml. of nitrobenzene with 2.8 g. of potassium hydroxide. Thereafter the nitrobenzene is distilled off and the crude product taken up in 1500 ml. of toluene at 50 to 60° C. and stirred with 1000 ml. of 5% sodium hydroxide solution. The aqueous phase is separated off and discarded whilst, after shaking with 500 ml. of water and clarification with 15 g. of Tonsil as filtration aid, the organic solvent was distilled off *in vacuo*, leaving 158 g. of 4-nitrodiphenyl amine melting at 130 to 131° C., recrystallised from carbon tetrachloride, corresponding to a yield of 74% of the theoretical yield.

EXAMPLE 11

The procedure is as described in Example 10, except that the crude product accumulating is directly recrystallised from carbon tetrachloride. 181 g. of 4-nitrodiphenyl amine melting at 118 to 121° C. are obtained in this way, corresponding to a yield of 84% of the theoretical yield.

What we claim is:

1. A process for the production of a nitrodiphenyl amine of the formula

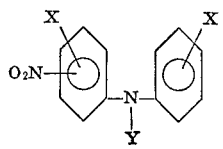

wherein each X, which may be the same or different, is hydrogen, alkyl or cycloalkyl having up to 6 carbon atoms, halogen or nitro and Y is hydrogen or alkyl or cycloalkyl having up to 6 carbon atoms, wherein a urethane of the formula

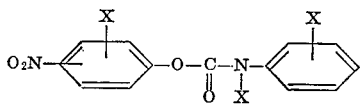

wherein X and Y are as aforesaid, is decarboxylated by heating in the presence of a catalytic amount of a strong base selected from the group consisting of alkali metal salts or organic acids, alkali metal carbonates, alkali metal oxides and alkali metal hydroxides at a temperature of 110 to 250° C.

2. A process as claimed in claim 1, wherein the reaction takes place in a solvent free of Zerewitinoff-active hydrogen atoms.

3. A process as claimed in claim 2, wherein the solvent is a polar solvent which boils at a temperature of from 100° C. to 250° C.

4. A process as claimed in claim 2, wherein the solvent is trichlorobenzene, nitrobenzene or dimethyl formamide.

5. A process as claimed in claim 1, wherein an alkali salt of an organic acid is used as catalyst.

6. A process as claimed in claim 1, wherein an alkali metal carbonate is used as a catalyst.

7. A process as claimed in claim 1, wherein an oxide or hydroxide of an alkali metal is used as catalyst.

8. A process as claimed in claim 5, wherein potassium acetate is used as catalyst.

9. A process as claimed in claim 6, wherein sodium or potassium carbonate is used as catalyst.

10. A process as claimed in claim 7, wherein sodium or potassium hydroxide is used as catalyst.

11. A process as claimed in claim 1, wherein the reaction takes place at a temperature in the range of from 150° C. to 220° C.

12. A process as claimed in claim 1, wherein the catalyst is used in a quantity of from 0.5 to 50 mol percent based on the urethane.

13. A process as claimed in claim 12, wherein the catalyst is used in a quantity of from 1 to 10 mol percent based on the urethane.

References Cited

UNITED STATES PATENTS 3,627,813    12/1971    Abbate et al. _____ 260—471 C

FOREIGN PATENTS 877,884    9/1961    Great Britain.

OTHER REFERENCES

Morrison and Boyd, Organic Chemistry, 1967, p. 592.
Migridichian, Organic Synthesis, 1957, pp. 297, 1331–1393.
Beilstein's Handbuch, Vol. VI, pp. 251, 257.

DONALD G. DAUS, Primary Examiner

D. E. WHEELER, Assistant Examiner

U.S. Cl. X.R.

260—455 A, 463, 471 C, 534